(12) United States Patent
Adams et al.

(10) Patent No.: US 8,403,397 B2
(45) Date of Patent: Mar. 26, 2013

(54) ADJUSTABLE TAILGATE SUPPORT

(75) Inventors: Stefan Adams, Pforzheim-Hohenwart (DE); Frank Haunstetter, Leonberg (DE); Michael Hubmann, Bad Rappenau (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 189 days.

(21) Appl. No.: 12/970,267

(22) Filed: Dec. 16, 2010

(65) Prior Publication Data

US 2011/0140476 A1    Jun. 16, 2011

(30) Foreign Application Priority Data

Dec. 16, 2009    (DE) .................. 10 2009 058 503

(51) Int. Cl.
*B62D 25/10*    (2006.01)
(52) U.S. Cl. ..... 296/106; 296/56; 296/146.4; 296/146.8
(58) Field of Classification Search ............. 296/56, 296/146.4, 146.8, 106; 49/341, 343, 344
See application file for complete search history.

(56) References Cited

U.S. PATENT DOCUMENTS

| | | | | |
|---|---|---|---|---|
| 2,371,336 A * | 3/1945 | Levon | | 49/340 |
| 4,623,132 A | 11/1986 | Smith | | |
| 5,002,172 A * | 3/1991 | Stringer | | 192/142 R |
| 5,673,593 A * | 10/1997 | Lafferty | | 74/89.38 |
| 6,516,567 B1 * | 2/2003 | Stone et al. | | 49/343 |
| 7,226,110 B2 * | 6/2007 | Doncov et al. | | 296/121 |
| 7,234,757 B2 * | 6/2007 | Mitchell | | 296/146.8 |
| 7,320,198 B2 * | 1/2008 | Berklich et al. | | 49/343 |
| 7,566,092 B2 * | 7/2009 | Paton et al. | | 296/146.8 |
| 7,665,794 B2 * | 2/2010 | Kachouh | | 296/146.3 |
| 7,681,469 B2 * | 3/2010 | Ritter | | 74/89.23 |
| 7,802,664 B2 * | 9/2010 | Hanna et al. | | 188/300 |
| 7,938,473 B2 * | 5/2011 | Paton et al. | | 296/146.8 |
| 7,992,460 B2 * | 8/2011 | Bochen et al. | | 74/424.76 |
| 8,006,817 B2 * | 8/2011 | Hanna et al. | | 188/300 |

(Continued)

FOREIGN PATENT DOCUMENTS

DE    36 00 845 A1    8/1986
EP    1 767 439 A2    3/2007

(Continued)

OTHER PUBLICATIONS

German Patent and Trademark Office Search Report, Dated May 25, 2010.

*Primary Examiner* — Glenn Dayoan
*Assistant Examiner* — Gregory Blankenship
(74) *Attorney, Agent, or Firm* — Gerald E. Hespos; Michael J. Porco; Matthew T. Hespos

(57) ABSTRACT

An adjustable tailgate support contains a fixed inner tube, which is connected to a lower housing part and on which is arranged a spiral spring. The spiral spring on the one hand is supported at the lower end on a setting element held on the inner tube and, on the other hand, is held fixed at a remote, upper, free end in the upper housing part. An increase or reduction in the spring force of the spiral spring can be set by turning the setting element, which has a supporting ring, on an external thread of the fixed inner tube.

6 Claims, 3 Drawing Sheets

U.S. PATENT DOCUMENTS

| | | | |
|---|---|---|---|
| 8,167,357 B2 * | 5/2012 | Kitayama et al. | 296/146.8 |
| 2006/0082188 A1 * | 4/2006 | Mitchell | 296/146.8 |
| 2007/0062119 A1 * | 3/2007 | Ritter | 49/343 |
| 2007/0194599 A1 * | 8/2007 | Paton et al. | 296/146.4 |
| 2009/0200830 A1 * | 8/2009 | Paton et al. | 296/146.8 |
| 2011/0140476 A1 * | 6/2011 | Adams et al. | 296/56 |
| 2012/0013143 A1 * | 1/2012 | Schiegel | 296/146.4 |

FOREIGN PATENT DOCUMENTS

| | | |
|---|---|---|
| EP | 1 835 111 A2 | 9/2007 |

* cited by examiner

ADJUSTABLE TAILGATE SUPPORT

CROSS-REFERENCE TO RELATED APPLICATION

This application claims the priority, under 35 U.S.C. §119, of German application DE 10 2009 058 503.6, filed Dec. 16, 2009; the prior application is herewith incorporated by reference in its entirety.

BACKGROUND OF THE INVENTION

Field of the Invention

The invention relates to an adjustable tailgate support with an electric spindle drive arranged in a cylindrical housing for moving the tailgate into an open and a closed position. The housing contains an upper and a lower housing part for moving the tailgate, which can be pushed partway one into the other and each of which has, at a free end, a bearing lug. One bearing lug, that on the upper housing part, is held in a supported manner with the tailgate and the other bearing lug, that on the lower housing part, is held in a supported manner on the vehicle body.

It is problematic for the support and actuation of a tailgate by a spindle drive that the operative forces of the drive have a wide tolerance range and that, owing to these tolerances, automatic opening or closure of the tailgate can occur, especially if stopped in an intermediate position.

SUMMARY OF THE INVENTION

It is accordingly an object of the invention to provide an adjustable tailgate support which overcomes the above-mentioned disadvantages of the prior art devices of this general type, which supports and actuates a tailgate in which automatic opening and closure from an intermediate position is avoided.

With the foregoing and other objects in view there is provided, in accordance with the invention an adjustable tailgate support. The adjustable tailgate support contains a cylindrical housing, an electric spindle drive disposed in the cylindrical housing for moving a tailgate into an open and a closed position, a fixed inner tube, and a settling element held on the fixed inner tube. The cylindrical housing has an upper housing part and a lower housing part for moving the tailgate. The upper and lower housing parts can be pushed partway one into another and each having a free end with a bearing lug. The bearing lug on the upper housing part is held in a supported manner with the tailgate and the bearing lug of the lower housing part is held in a supported manner on a vehicle body. The lower housing part has a spiral spring disposed on the fixed inner tube. The spiral spring has a lower end supported on the setting element and a remote, free end held fixed in the upper housing part.

The principal advantages achieved by the invention are that it is possible to obtain an increase or a reduction in a spring force of the tailgate actuation system in a simple manner and, as a result, it is also possible to take into account different tailgate weights. According to the invention, this is achieved in an advantageous manner if a spiral spring is arranged on a fixed inner tube of the tailgate support of a lower housing part, the spiral spring on the one hand being supported at the lower end on a setting element held on the inner tube and, on the other hand, being held fixed by a remote, free end in the upper housing part. The setting element preferably consists of a supporting ring with an internal thread, which is arranged rotatably in such a way on an external thread of the inner tube that an increase or a reduction in a spring force of the spiral spring can be set. This rotatable supporting ring on the external thread of the inner tube is a simple manual way of enabling the spiral spring to be prestressed or relaxed in terms of its spring force. Depending on the power of the drive, it can be adjusted to the desired force on the production line.

In particular, the supporting ring has depressions or holes, arranged in a manner distributed around the circumference, for insertion of a handling tool in order to carry out adjustment of the supporting ring by turning the latter. The handling tool has, for example, a pin, which engages in one of the depressions in order to turn the supporting ring. By turning the tool, the supporting ring is likewise turned accordingly on the external thread of the inner tube. To indicate the rotation angle, at least one depression is provided with a color marking.

Access to the supporting ring, which is covered by the lower housing part, is achieved by an aperture in the housing part, at least in the region of one depression or hole. The aperture can be closed off at the outside by a covering cap.

According to another embodiment of the invention, the setting element can consist of a supporting ring, which is positively guided in a stepped slotted guide, which is provided with notches and is arranged on the outside of the inner tube and into which an internal pin on the supporting ring engages and is held in the notches. In particular, the slotted guide is embodied with an obliquely upward slope, thus making it possible to set an increase or a reduction in a spring force of the spiral spring. This further embodiment for adjustment of the supporting ring on the inner tube in a slotted guide, by the obliquely rising profile of the slotted guide, likewise gives an increase or a reduction in a spring force of the spiral spring. Here too, the supporting ring is turned by a handling tool, which engages in an appropriate manner in the circumferential holes.

Other features which are considered as characteristic for the invention are set forth in the appended claims.

Although the invention is illustrated and described herein as embodied in an adjustable tailgate support, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
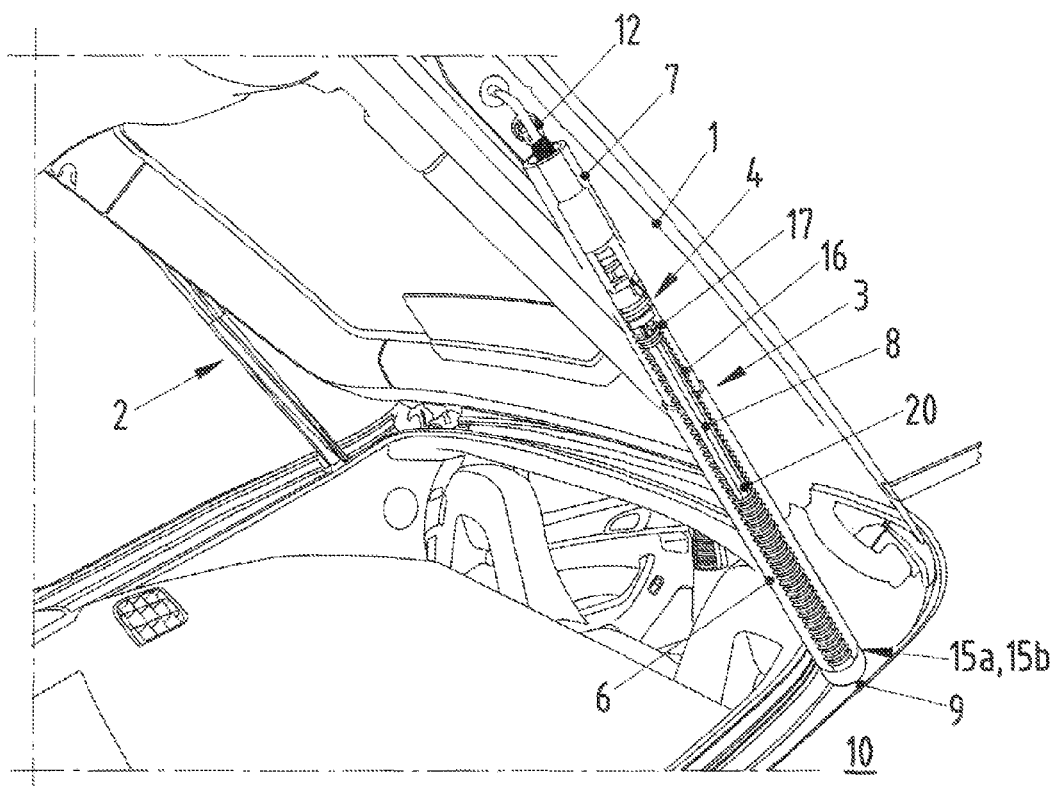
FIG. 1 is a diagrammatic, perspective view of a tailgate of a motor vehicle with adjustable tailgate supports according to the invention.

Referring now to the figures of the drawing in detail and first, particularly, to FIG. 1 thereof, there is shown a tailgate 1 for a motor vehicle which is held in an open and a closed position by supports 2, 3, and the tailgate 1 can be moved into these positions. For movement, the tailgate supports 2, 3 each preferably have an electric spindle drive 4, which is arranged in a cylindrical housing. The housing consists essentially of a lower, first housing part 6 and a second, upper housing part 7. A free end of the lower housing part 6 is securely connected to an inner tube 20 and to a spindle 8 of the spindle drive 4, and there is an adjoining bearing lug 9 for support on a body structure 10.

Arranged coaxially on the inner tube 20 is a spiral spring 16, which is supported by its lower end 18 on a setting element 15 embodied as a supporting ring 15a and, at the upper end 17, is held fixed in the upper housing part 7. The upper housing part 7 likewise has a bearing lug 12, which is connected to the tailgate 1. By the spindle 8, the lower housing part 6 is pushed over the fixed, cylindrical upper housing part 7 by an electric drive to move the tailgate.

Figure 2:
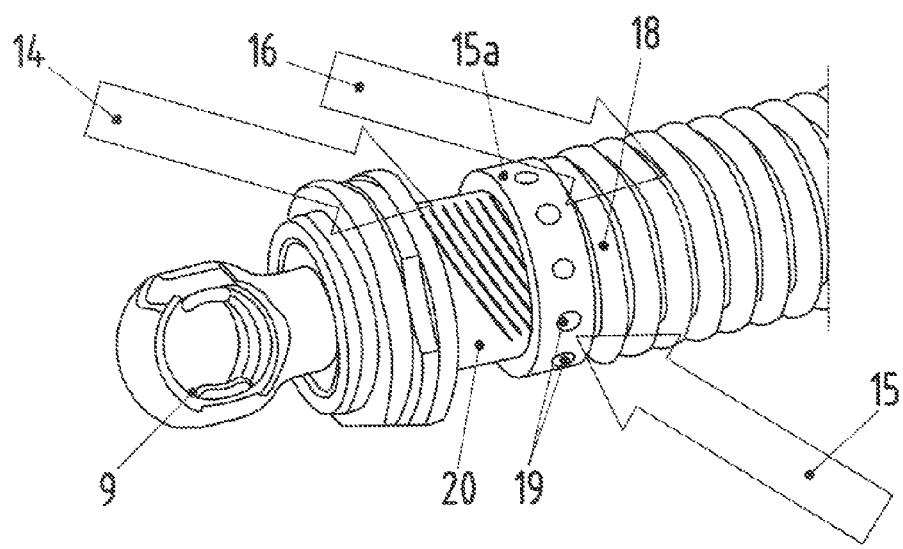
FIG. 2 is a diagrammatic, perspective view of a lower end of the tailgate support with a spiral spring arranged on an inner tube and with support on an adjustable supporting ring as a setting element.

Arranged on the fixed inner tube 20 of each of the tailgate supports 2, 3, at the lower end, is an external thread 14 (see FIG. 2), on which the supporting ring 15a is held rotatably by an internal thread. The lower end 18 of the spiral spring 16 is held supported on the supporting ring 15a and its spring force can be modified axially by turning, resulting in an increase or a reduction in the spring force.

Figure 4:
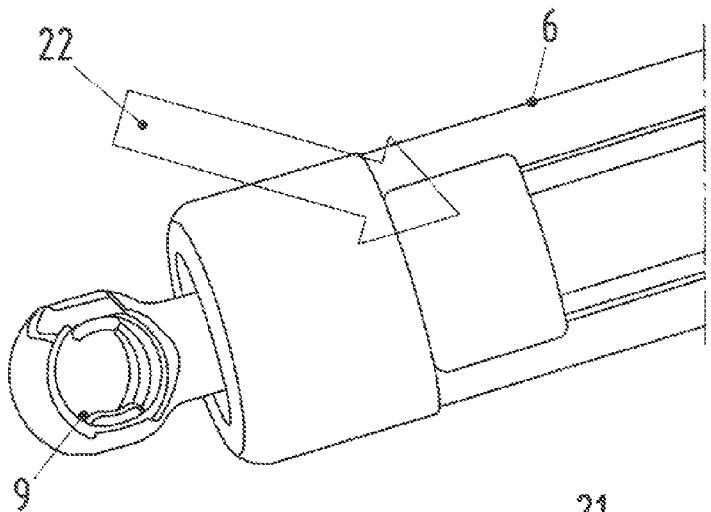
FIG. 4 is a diagrammatic, perspective view of a covering part, which closes off an aperture.
Figure 3:
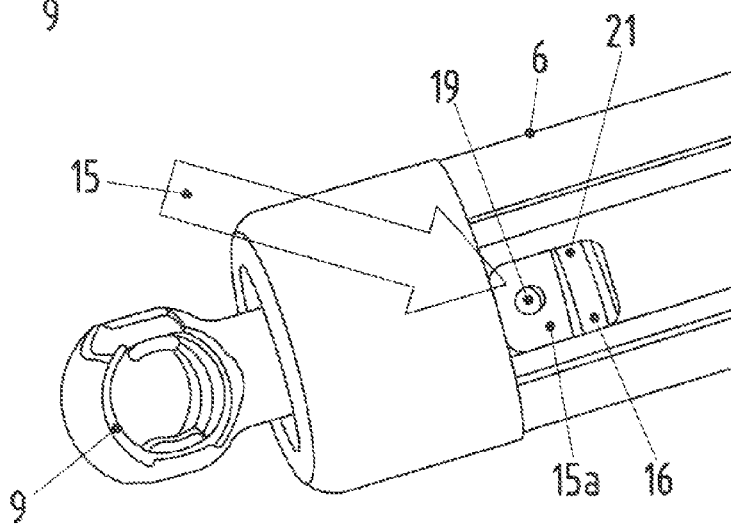
FIG. 3 is a diagrammatic, perspective view of a lower end of the tailgate support with a lower housing part fitted over, and depressions which free the supporting ring over a certain area via an aperture.

To allow adjustment of the supporting ring 15a, the ring has depressions 19 or holes, arranged in a manner distributed around its circumference, into which a pin of a handling tool can be inserted for the purpose of turning it. In the region of the supporting ring 15a, the lower housing part 6 has an aperture 21 (see FIG. 3), which exposes at least one depression 19 to allow access for the handling tool. The aperture 21 can be covered with respect to the outside by a covering cap 22 (see FIG. 4).

Figure 5:
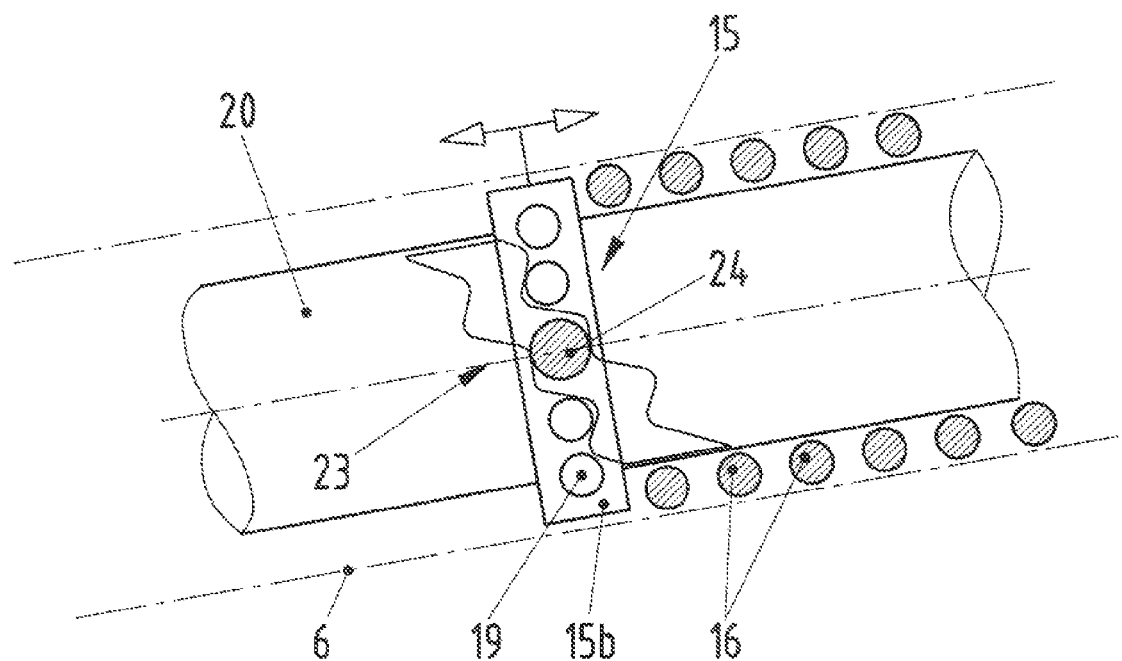
FIG. 5 is a schematic representation of a further setting element with a rising slotted guide for the supporting ring on the inner tube.

According to another embodiment of the invention, the setting element 15 can consist of a supporting ring 15b (see FIG. 5), which is positively guided in a slotted guide 23 on the inner tube 20 to allow axial adjustment of the spiral spring 16, the slotted guide 23 being in engagement with an internal pin 24 on the supporting ring 15b. A plurality of latching positions for the internal pin 24 are possible in the slotted guide 23. The slotted guide 23 is preferably embodied with an obliquely upward slope, making it possible to set an increase or a reduction in the spring force of the spiral spring 16.

The invention claimed is:

1. An adjustable tailgate support, comprising:
    a cylindrical housing;
    an electric spindle drive disposed in said cylindrical housing for moving a tailgate into an open and a closed position;
    a fixed inner tube having an external thread;
    a settling element having a support ring with an internal thread, which is disposed rotatably in such a way on said external thread of said fixed inner tube that an increase or a reduction in a spring force of said spiral spring can be set;
    said cylindrical housing having an upper housing part and a lower housing part for moving the tailgate, said upper and lower housing parts can be pushed partway one into another and each having a free end with a bearing lug, said bearing lug on said upper housing part being held in a supported manner with the tailgate and said bearing lug of said lower housing part being held in a supported manner on a vehicle body; and
    said lower housing part having a spiral spring disposed on said fixed inner tube, said spiral spring having a lower end supported on said setting element and a remote, free end held fixed in said upper housing part.

2. The adjustable tailgate support according to claim 1, wherein said supporting ring has one of depressions and holes formed therein and disposed in a manner distributed around a circumference of said supporting ring, for insertion of a handling tool for carrying out an adjustment by turning the handling tool.

3. The adjustable tailgate support according to claim 2, wherein said lower housing part covers said spiral spring and, in a region of at least one of said depressions in said supporting ring, said lower housing part has an aperture formed therein for the insertion of the handling tool.

4. The adjustable tailgate support according to claim 3, further comprising a covering cap for closing off at an outside said aperture.

5. The adjustable tailgate support according to claim 1, wherein:
    said fixed inner tube contains an outer side having a stepped slotted guide with notches formed therein; and
    said setting element has a supporting ring, which is positively guided in said stepped slotted guide, and an internal pin disposed in said stepped slotted guide and engages and is held in said notches.

6. The adjustable tailgate support according to claim 5, wherein said stepped slotted guide is embodied with an obliquely upward slope, thus making it possible to set an increase or a reduction in the spring force of said spiral spring.

* * * * *